F. DE BORGGRAVE.
VEHICLE WHEEL AND RESILIENT TIRE THEREFOR.
APPLICATION FILED JUNE 17, 1921.

1,424,086.

Patented July 25, 1922.
2 SHEETS—SHEET 1.

Felix De Borggrave
INVENTOR

BY Victor J. Evans
ATTORNEY

F. DE BORGGRAVE.
VEHICLE WHEEL AND RESILIENT TIRE THEREFOR.
APPLICATION FILED JUNE 17, 1921.
1,424,086.
Patented July 25, 1922.
2 SHEETS—SHEET 2.
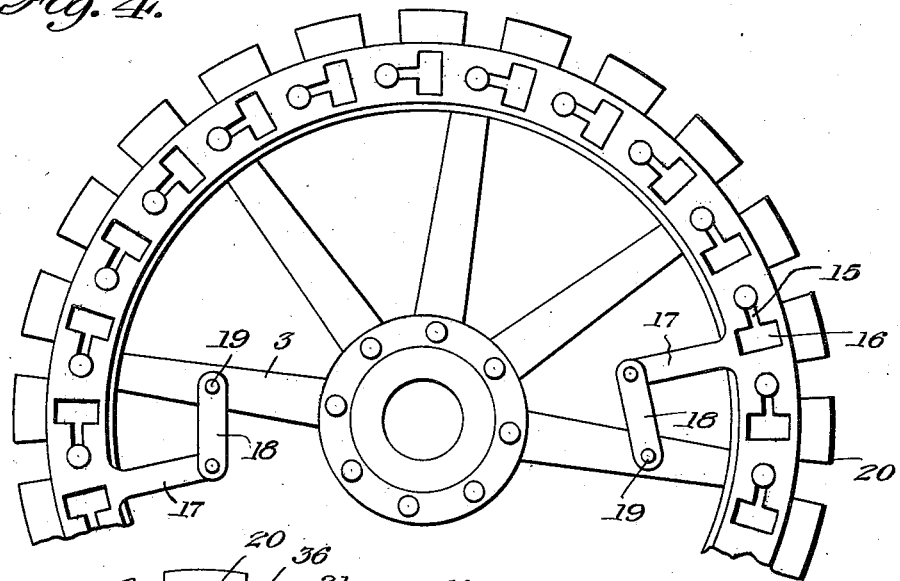
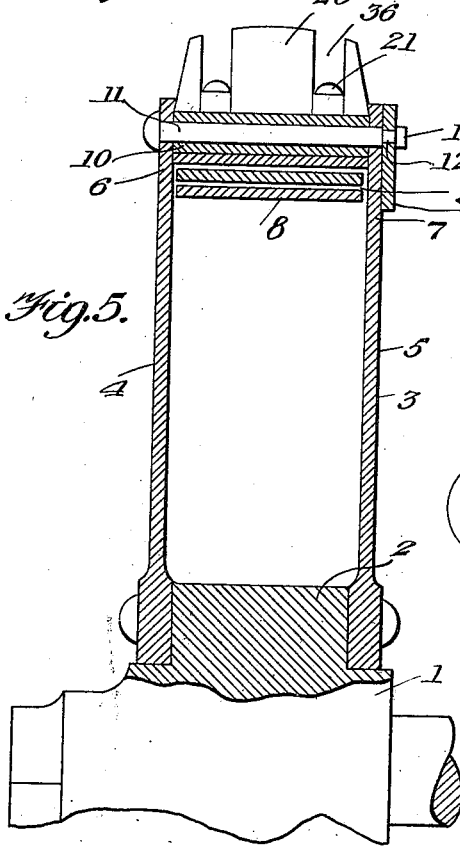
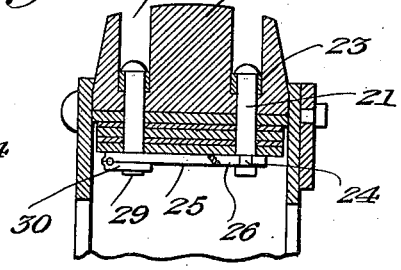
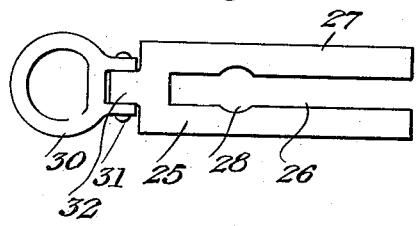
Felix De Borggrave
INVENTOR
BY Victor J. Evans
ATTORNEY

UNITED STATES PATENT OFFICE.

FELIX DE BORGGRAVE, OF CHICAGO, ILLINOIS.

VEHICLE WHEEL AND RESILIENT TIRE THEREFOR.

1,424,086.

Specification of Letters Patent.   Patented July 25, 1922.

Application filed June 17, 1921. Serial No. 478,376.

*To all whom it may concern:*

Be it known that I, FELIX DE BORGGRAVE, a citizen of the United States, residing at Chicago, in the county of Cook and State of Illinois, have invented new and useful Improvements in Vehicle Wheels and Resilient Tires Therefor, of which the following is a specification.

This invention relates to vehicle wheels and more particularly to a wheel structure primarily designed to accommodate the construction of a resilient tire and also relates to a novel form of resilient tire.

An object of this invention is to provide a resilient tire structure which will embody cushioning proclivities of approved types of pneumatic tires and eliminate many inconveniences contingent with the use of pneumatic tires such as blowouts, punctures, rim cut, etc.

Another object of the invention is to provide a resilient tire structure as specified, in which the resiliency of the tire is augmented by a plurality of leaf springs extending circumferentially about the tire structure and which carry a plurality of circumferentially spaced cushioning tread members, the said members being spaced sufficiently to prevent circumferential and lateral skidding of a wheel constructed in accordance with this invention.

A further object of the invention is to provide a resilient tire and wheel structure designed so that it may be quickly and readily assembled as well as one in which the parts are connected and locked so as to prevent them from working loose during vibration.

Other objects of the invention will appear in the following detailed description and in the accompanying drawing wherein:

Fig. 4 is a fragmentary side elevation of the improved wheel and tire showing the side opposite to that illustrated in Fig. 1.

Fig. 5 is a radial section taken on the line 5—5 of Fig. 1.

Fig. 6 is a detail radial section taken on the line 6—6 of Fig. 1.

Fig. 7 is a detail plan of a locking member used in the tire construction.

Figure 1:
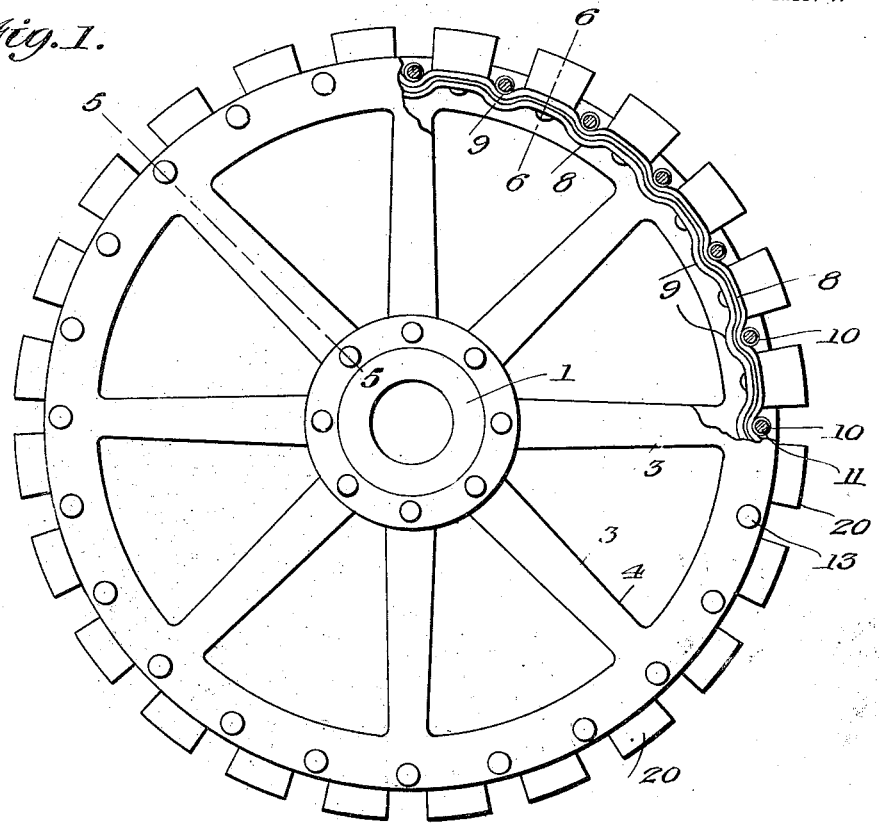
Fig. 1 is a side elevation partly in section of the improved wheel.
Figure 2:
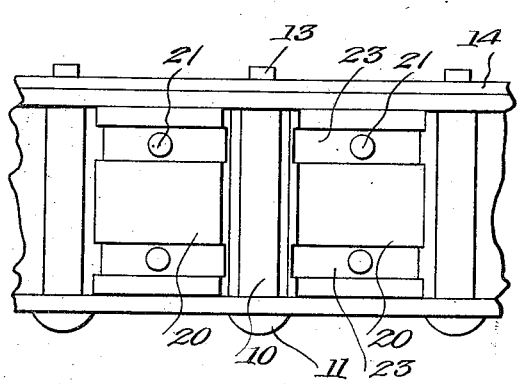
Fig. 2 is a fragmentary plan of the resilient tire.

Referring more particularly to the drawing the improved wheel structure comprises a hub 1 having an annular flange 2 formed thereon to which the spoke structures 3 are connected. The spoke structures 3 are formed in sections 4 and 5 and they have rim forming annular flanges 6 and 7 respectively formed thereon which serve as housings for the plurality of leaf springs 8. The leaf springs 8 are disposed in laminated relation and extend circumferentially of the wheel rim or tire structure having instruck portions 9 formed therein at circumferentially spaced intervals in which the bolt receiving sleeves 10 engage. The adjacent portions of the springs at the instruck portions are spaced as shown at 9'. The bolt receiving sleeves 10 form housings for the bolts 11 which connect the flanges 6 and 7 for retaining them in proper position and preventing lateral movement of the springs 8. The springs 8 embody a high degree of resiliency and are yieldable for absorbing shocks occasioned by the travel of the vehicle wheel. The bolts 11 extend through the flange 7 and are grooved or reduced in diameter adjacent the outer side of the flange as shown at 12 providing heads 13 on their outer ends. A locking ring 14 is provided which is in turn provided with a plurality of circumferentially extending slots 15 intermediate its inner and outer perimeters and which open out into enlarged openings 16 of sufficient size to permit the insertion of the heads 13 thereinto. In mounting the locking ring 14 upon the wheel and locking the bolts against accidental disconnection the locking ring is placed with the openings 16 in registration with the heads 13 of the bolts after which the ring is moved laterally so that the slots 15 will register with the grooves 12 in the bolts after which the ring is rotated slightly by means of the handles 17 thereon to bring the heads 13 out of registration with the enlarged openings 16 and cause the groove or reduced portion 12 to engage in the slots 15 which are of sufficient width to bind against the reduced portions 12. The ring 14 is then locked in position by means of the links 18 which are pivoted to the handle 17 and securely bolted to the adjacent spokes 3 by means of suitable bolts 19. When it is desired to take the wheel and tire structures apart the bolts 19 are removed and the locking ring 14 is rotated to bring the enlarged openings 16 in registration with the heads 13 at which time the ring may be moved laterally out of engagement with the bolts.

Figure 3:
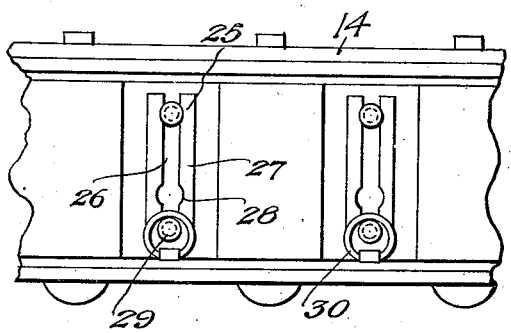
Fig. 3 is a fragmentary plan of the tire looking outwardly from the axis of the wheel.

The springs 8 have a plurality of tread members 20 attached thereto in circumferentially spaced relation about the perimeter of the tire, by means of bolts 21 which are embedded in the tread members 20 and extend through the springs 8 as clearly shown in Fig. 6 of the drawing. Oblong washers 23 are mounted in the recesses in the tread members 20 and extend there across. The bolts 21 extend through the washers 23 which prevent their cutting into the rubber or material of which the cushioning tread members 20 are formed. The bolts 21 are locked against accidental loosening movement by a novel lock structure 25 clearly shown in Figures 3, 6 and 7 of the drawing. The bolts are provided with reduced portions 24 which are adapted to be engaged in the longitudinal recess 26 formed in the main body 27 of the lock structure 25. The recess 26 is enlarged intermediate its ends, as shown at 28, to receive the ends 29 of certain of the bolts 21 outwardly of their reduced portions 24 after which the locking members 25 are driven laterally over the bolts causing the sides of the recess 26 to securely bind the reduced portions 24 of the bolts 21. A locking ring 30 is pivotally carried as shown at 31 by a suitable lug 32 formed upon the body 27. After the body 27 has been driven to the proper position upon the bolts 21 the ring 30 is swung upon its pivot to engage the heads or outer ends 29 of certain of the bolts 21 and prevent reverse sliding movement of the body 27 off the bolts. The friction of the bolts 21 against the rings 30 will hold the rings folded against the body and prevent accidental pivotal movement of the rings. It is to be understood that the locking members 25 are placed in proper position upon the bolts 21 before the annular flange 6 and spokes 4 are connected to the annular flange 2 and annular flange 7. If it is so desired the openings indicated at 36, formed in the tread members 20, may be plugged or filled with rubber or analogous material which may be vulcanized to the main body of the tread members.

From the foregoing description taken in connection with the accompanying drawing it will be apparent that a wheel and resilient tire structure has been provided which will materially increase the longevity of vehicle tires, eliminating much of the upkeep expense contingent with the provision of resilient or pneumatic tires of approved types as well as one which will embody sufficient resiliency to absorb shocks contingent with the travel of the wheel over rough surfaces. In case any one of the springs should be broken or become crystallized and consequently rendered partially nonresilient it would be maintained in its proper position and its resiliency utilized owing to the arrangement of the bolts 11 and flanges 6 and 7.

It is, of course, to be understood that the invention may be constructed in various other manners and the parts associated in different relations and, therefore, I do not desire to be limited in any manner except as set forth in the claims hereunto appended.

Having thus described my invention what I claim is:

1. In a vehicle wheel, the combination of a plurality of circular leaf springs, flanges for preventing relative lateral movement of said springs, spokes carried by said flanges, bolts connecting said flanges, and a locking ring for locking said bolts and flanges in position.

2. In a vehicle wheel, the combination of a plurality of circular leaf springs, flanges for preventing relative lateral movement of said springs, spokes carried by said flanges, bolts connecting said flanges, a locking ring for locking said bolts and flanges in position, handles formed upon said ring for moving the same, links pivoted to said handles and adapted to be bolted to certain of said spokes for locking the locking ring against movement.

3. In a vehicle wheel, the combination of a plurality of circular leaf springs, flanges for preventing relative lateral movement of said springs, spokes carried by said flanges, bolts connecting said flanges, a locking ring for locking said bolts and flanges in position, a plurality of cushioning tread members mounted upon the outermost of said springs in circumferentially spaced relation one to another, bolts extending through said springs and tread members, and locking members engaging said bolts for preventing relative movement of the tread members and springs.

4. In a vehicle wheel, the combination of a plurality of circular leaf springs, flanges for preventing relative lateral movement of said springs, spokes carried by said flanges, bolts connecting said flanges, a locking ring for locking said bolts and flanges in position, a plurality of cushioning tread members mounted upon the outermost of said springs in circumferentially spaced relation one to another, bolts extending through said springs and tread members, locking members engaging said bolts for preventing relative movement of the tread members and springs, handles formed upon said ring for moving the same, links pivoted to said handles and adapted to be bolted to certain of said spokes for locking the locking ring against movement.

In testimony whereof I affix my signature.

FELIX DE BORGGRAVE.